United States Patent
Colombet et al.

(10) Patent No.: US 7,166,159 B2
(45) Date of Patent: Jan. 23, 2007

(54) CEMENT COMPOSITION, ITS USE FOR THE PRODUCTION OF A SELF-LEVELING LIQUID CASTING, AND A CASTING THUS OBTAINED

(75) Inventors: Pierre Colombet, Longnes (FR); Jean Ambroise, Brignais (FR); Jean-Pierre Grelaud, Sandrancourt (FR); Michel Pasquier, Noisy le Roi (FR)

(73) Assignee: Ciments Francais, Puteaux (FR)

( * ) Notice: Subject to any disclaimer, the term of this patent is extended or adjusted under 35 U.S.C. 154(b) by 0 days.

(21) Appl. No.: 10/914,229

(22) Filed: Aug. 10, 2004

(65) Prior Publication Data

US 2005/0005821 A1    Jan. 13, 2005

Related U.S. Application Data

(62) Division of application No. 09/975,954, filed on Oct. 15, 2001.

(30) Foreign Application Priority Data

Oct. 13, 2000  (FR) .................................. 00 13117

(51) Int. Cl.
  *C04B 24/00*  (2006.01)

(52) U.S. Cl. ...................... 106/724; 106/726; 106/728; 106/823

(58) Field of Classification Search ................ 106/724, 106/726, 728, 823
See application file for complete search history.

(56) References Cited

U.S. PATENT DOCUMENTS

| 4,394,175 | A | * | 7/1983 | Cheriton et al. |  |
|---|---|---|---|---|---|
| 5,558,709 | A | * | 9/1996 | Weichmann et al. | 106/727 |
| 5,873,936 | A | * | 2/1999 | Ogden | 106/715 |
| 5,910,215 | A | * | 6/1999 | Frouin et al. | 106/772 |
| 6,309,457 | B1 | * | 10/2001 | Guerinet et al. |  |
| 6,436,184 | B1 | * | 8/2002 | Ceccaldi et al. | 106/715 |

FOREIGN PATENT DOCUMENTS

| DE | 3909070 | * | 3/1989 |
|---|---|---|---|
| DE | 39 09 070 |  | 9/1990 |
| FR | 2 780 396 |  | 12/1999 |
| JP | 58036956 | * | 3/1983 |
| JP | 58120554 | * | 7/1983 |
| JP | 11157898 |  | 6/1999 |

* cited by examiner

*Primary Examiner*—Paul Marcantoni
(74) *Attorney, Agent, or Firm*—Young & Thompson

(57) ABSTRACT

A cement composition for liquid casting, based on a binder comprising Portland cement and additives comprising at least a fluidizer and a combination of a thickening agent acting by steric exclusion and a gelling thickening agent. The composition can also include a surface active agent to regulate the quantity of entrained air. Mixed with water and an aggregate, it permits obtaining, in a single casting, a self-leveling casting of a high thickness (equal to at least 6 cm) and of low density (about 1.6 to 1.9).

20 Claims, 4 Drawing Sheets

Figure 1:
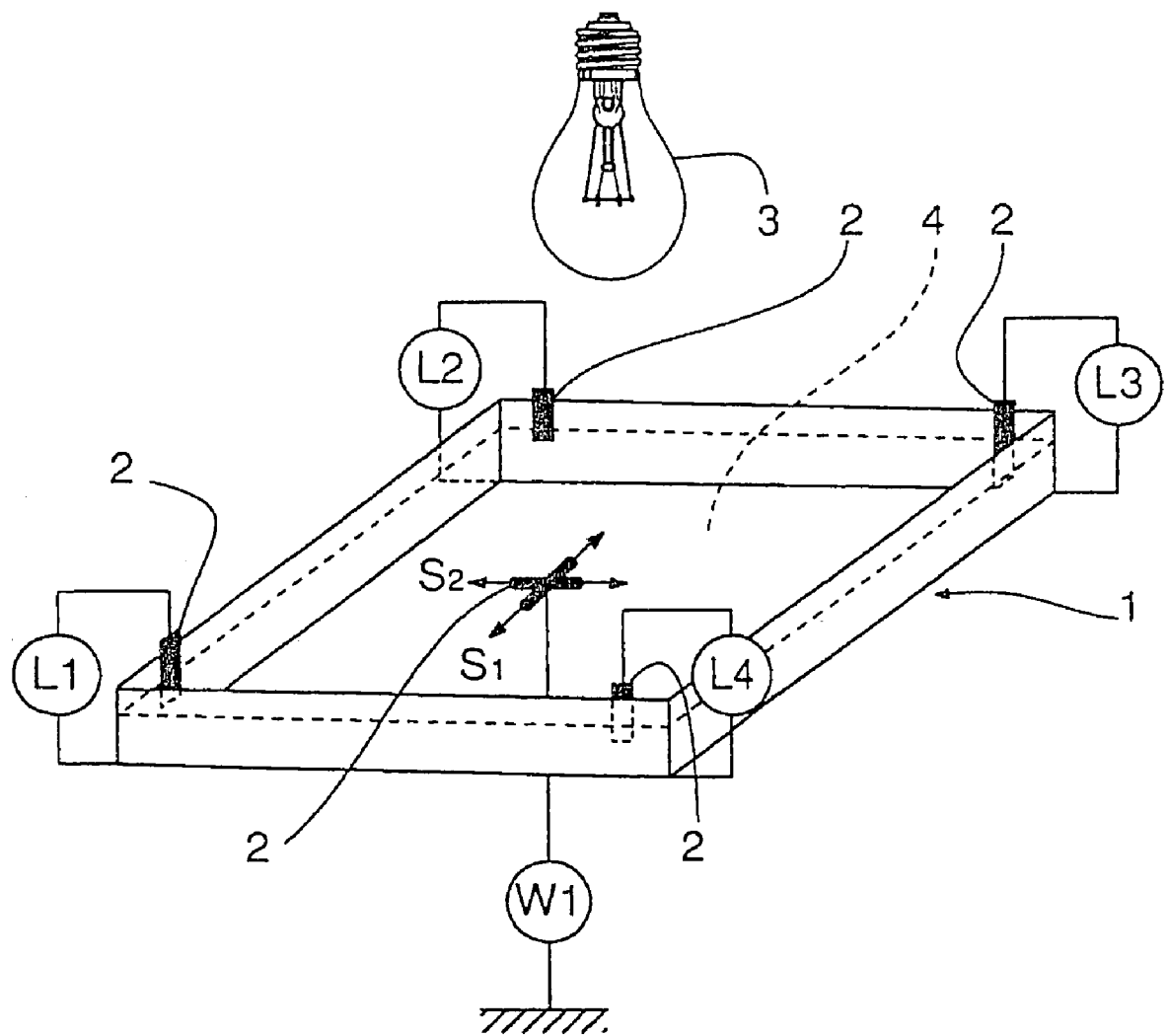

CEMENT COMPOSITION, ITS USE FOR THE PRODUCTION OF A SELF-LEVELING LIQUID CASTING, AND A CASTING THUS OBTAINED

CROSS REFERENCE TO RELATED APPLICATIONS

This application is a division of co-pending application Ser. No. 09/975,954, filed on Oct. 15, 2001, the entire contents of which are hereby incorporated by reference.

The present invention relates to the field of cement compositions, used for the production of liquid castings, in particular self-leveling, their process of production and castings thus produced.

1. State of the Art

A fluid (or liquid) casting is formed from a cement composition with a binder, very often an aggregate, which is generally sand, and at least one additive, which is a fluidizer (also called a superplastifier or a dispersant), which transforms the mixture into a paste whose consistency is near, after mixing, that of water. This explains the self-leveling and self-smoothing character of the product. Such castings are very useful in the field of construction and of building because of their appearance (almost a mirror), their very high ease of use, and their aptitude to making up for unequal levels and to clad solar heating tubes.

The different types of castings are distinguished by their granulometry, the nature of their binder and their method of preparation.

In the prior art, granulometry has an influence on the appearance of the surface. The greater the size of the granulate (or aggregate), the rougher is the surface. By using sand less than about 1 mm, there is obtained a perfectly smooth surface. Beyond that, the sand projects from the surface giving to it a certain shape because of the appearance of protruberances which begin to be visible to the naked eye when the upper limit of its granular range exceeds about several mm.

The binders most often used at present are either alumina cement, with hydrated calcium sulfate added or not, to form ettringite as a hydration product and thereby to reduce shrinkage after drying, or natural or synthetic anhydrite (anhydrous calcium sulfate) which transforms to gypsum at the end of the reaction.

The anhydrite castings have the principal drawback of being, after drying, very sensitive to water. Any rehumidification of the anhydrite casting by raising the support slab or from products of positioning the coating, is hence prohibited, which complicates the production conditions (local enclosure, covering for example) which must be carefully respected for fear of rapidly giving rise to serious disorders in the strength of the ground covering (rehumidification can decrease by 40% the resistance of the casting).

Moreover, anhydrite castings have upon drying increases of gypsum which crystallizes, accompanied by increases of exudation. Efflorescence, soft exudation or a vitrified crust which can result, must then be eliminated by sanding, brushing or planing.

The use of alumina cement as a binder, instead of anhydrite, gives the advantage of insensitivity to water when the casting has hardened.

As to preparation, these products exist in the dry form, which is to say ready to be mixed, or in the fluid mortar form. The case of fluid mortar is particularly interesting for delivery to the work site by cement mixer followed by transfer by pumping; the mortar is then prepared and mixed at a concrete center, then delivered ready to use. All the user has to do is to cast it into a casting. In addition to the limited number of operations to be carried out by the user and the saving of time and labor which results, such a preparation guarantees regularity of the quality of the product.

However, in the case of preparation in the form of a fluid mortar, ready to use and produced at the concrete center, the use of alumina cement is not wise because this type of cement sets up rapidly (about two hours) so that the mortar loses its characteristic of fluidity indispensable for transport. This explains why liquid castings, for which the binder is alumina cement, are prepared in dry form, and mixed at the work site just before casting.

For a fluid mortar, it is therefore preferable to use as the binder Portland cement which has a distinctly greater setup time (four hours or more).

In this field, patent application EP 0 725 044 relates to a fluid mortar composition comprising ordinary Portland cement with, as fluidizing agent, an acrylic dispersant obtained by copolymerization of well-identified monomers, to which is added a viscosity agent, which ensures the cohesion or stability (absence of sweating and sedimentation) of the mortar, an anti-foaming agent, a setting accelerator and a shrinkage reducing agent. The composition also comprises granulates (sand), a natural anhydrite (in proportions substantially greater than about 5% relative to the cement). The properties of such a casting as to duration of fluidity (greater than 3 hours) without segregation between the different mineral components and water, which segregation generally occurs in very fluid mortars. In other words, this fluid mortar is cohesive or stable, which is to say that it does not undergo either sweating or sedimentation. Such properties are compatible with the production of a casting from fluid mortar ready to use, produced at a central location and deliverable by truck.

Moreover, the composition of EP 0 725 044 has another important property, which is not described in the text of the corresponding application, but is well known to those skilled in the art. This property flows from the presence of anhydrite. It consists in an aptitude to limit notably the undesirable effect of eventual drying of the casting once emplaced and hardened, on the occasion, for example, of a rapid and great increase of ambient temperature. The undesirable effect in question is that of rising of the edges of the casting, or warping, and of the consecutive formation of microfissures under the influence of its own weight. This malfunction, also called "curling", is connected to the differential shrinkage between the bottom and the surface of the casting, which differential is caused by a humidity gradient taking place during drying, particularly during abrupt increase of ambient temperature. The shrinkage differential gives rise to the appearance of mechanical stresses. The instability which thus results is released by rising of the edges. The presence of anhydrite remedies this drawback because by hydrating itself by a chemical reaction with the mixing water and the cement, it transforms itself into gypsum and ettringite, molecules believed to be adapted to ensure the function of water retention. The retention thus provided opposes the establishment of a humidity gradient between the bottom and the surface of the casting during rapid drying, and hence the establishment of differential shrinkage.

2. The Problems that Arise

However, the composition of patent application EP 0 725 044, although adapted for transportation, for pouring at the worksite and for the reduction of the phenomenon of "curling", has the drawback of having to be prepared and blended at a specialized production site because it comprises anhydrite. Thus, the conventional concrete centers, which are adapted for mixing granulates (sand for example), binders and additives and for blending them with water, do not permit the use of anhydrite, whether natural or synthetic, even partially, because the latter would necessarily pollute the storage, transport, mixing and blending installations, used moreover for the production of conventional concrete that is ready to use. However, any anhydrite impurity is absolutely prohibited for conventional concrete because of the risks of deterioration of this latter once hardened, connected to the delayed formation of ettringite, risks that are well known to those skilled in the art.

Moreover, as to the use of 100% anhydrite castings, it is not possible to pour more than 3 cm of thickness in a single pass, which is to say that for the production of castings whose thickness is greater than this value (for example for castings adapted to clad solar heating tubes), it is necessary to pour a first layer of fluid mortar (about 3 cm), to wait 24 to 48 hours, then to cast the second layer and to let it stand again. The thickness of these castings thus not need exceed 6 cm for obvious reasons of output.

The object of the present invention is thus to provide a cement composition for fluid castings which overcomes the mentioned drawbacks, whilst preserving the conventional properties required for any fluid mortar, described hereafter:

in addition to the perfectly smooth appearance mentioned above, the fluid mortar must keep its fluidity and its cohesion or stability (absence of sweating) for at least three hours, the absence of sedimentation, which is measured (more particularly that the sweating during the latter is negligible) after hardening, is also required, once cast in the form of a plate of small thickness relative to its other dimensions, then hardened, it must have a warping or curling as small as possible, which is to say must keep its initial planarity even after complete drying, finally, the hardening of the mortar must take place before 24 hours (after blending in the concrete center) so as not to interfere with the further train of operations carried out by other workers at the workplace).

3. DESCRIPTION OF THE INVENTION

To overcome all the mentioned drawbacks and to provide the properties required above, the inventors have produced a cement composition for liquid (fluid) casting with binder and additives, in which the binder comprises Portland cement, and the additives comprise at least one fluidizer and a combination of a thickening agent (so-called conventional) acting by steric exclusion (or hindrance) and a thickening agent of the gelling (or associating) type. According to a preferred modification of the invention, the binder comprises Portland cement, without supplemental addition of calcium sulfate other than the setting regulator (gypsum introduced during crushing the clinker).

The additives can also include, other than agents modifying the rheology mentioned above (fluidizing and thickening) a surface-active agent to regulate the quantity of entrained air.

Such a composition permits obtaining the requisite properties for fluid casting produced for example in the form of mortar or concrete. Thus it combines easy handling (giving a self-leveling character), controlled rheology (avoiding sedimentation and sweating) and reduced curling. Having no anhydrite, the composition according to the preferred embodiment of the invention can be produced at a conventional concrete center. Moreover, it permits producing in a single casting self-leveling castings whose thickness exceeds about 5 to 6 cm.

Moreover, with respect to the difficulty of reconciling the high fluidity necessary for operations (pumpability and emplacement under the effect of gravity alone) and the absence of sedimentation and sweating, the composition according to the present invention, contrary to known self-positioning or self-leveling mortars, which always require a very compact granular mixture (which is to say ensuring a granular distribution as wide as possible, in particular to limit the phenomena of segregation) has the enormous advantage of being free from this restraint thanks to a rheological profile such that the cement composition is fluid when confined (permitting pumping it and spreading it) and rapidly thickens when it is at rest (avoiding sedimentation of the granulate, sweating and rising of air bubbles). Such a profile is obtained with a balanced combination of agents that modify rheology, without having recourse to control of the compactness of the granular mixture which, in a conventional manner, would be obtained by completing the granular distribution of the cement by that of fine particles, such as ash, silica smoke or crushed swag. To this end, the composition according to the present invention preferably comprises, for 100 parts by weight of Portland cement, from 1 to 5 parts of a methacrylate base fluidizer or of the polynaphtalene sulfonate type, or melamine sulfonate, and preferably comprises, for 100 parts of Portland cement, from 0.3 to 1 part of fluidizer, 0.02 to 1 part of thickening agent acting by steric exclusion and from 0.1 to 0.5 part of a thickening agent of the gelling type. Throughout this specification, the parts of additive are parts by weight of active material.

Still more preferably, the composition comprises, for 100 parts of Portland cement, from 0.13 to 0.5 part of fluidizer, from 0.1 to 0.3 part of thickening agent acting by steric exclusion, and from 0.05 to 0.15 part of thickening agent of the gelling type.

Thus the cement material (fluid and hardened) has the propert of having a low compactness, which is to say a high porosity, resulting in low density.

It also appears that the presence of surface-active agent in the composition according to the invention permits regulating the quantity of air present in the final material, hence its porosity. Thus, a concentration of 0.01 to 0.15 part of surface active agent per 100 parts by weight of Portland cement, permits regulating the quantity of entrained air between about 15 and 20% by volume in the final material, corresponding to a density of the order of about 1.6 to 1.9.

The composition according to the invention permits obtaining castings whose mechanical resistance is sufficient up to 24 hours, which is to say having a mechanical resistance of at least about 0.9 Mpa, which avoids limiting for too great a time the access to the workplace.

Moreover, in a surprising manner, although comprising no anhydrite, the composition according to the preferred embodiment of the invention also has the advantage of considerably reduced tendency to curl, guaranteeing a flatness of the casting, after its complete drying.

The cement composition according to the invention is conventionally and preferably mixed with an aggregate.

Preferably, the aggregate is sand of low granulometry or equal to about 5 mm.

This aggregate can be present in quite variable proportions, ranging for example from 250 to 500 parts per 100 parts of cement. The composition according to the invention also has the advantage of obtaining castings with a very smooth surface from which do not protrude the largest granulates.

The consistency and workability are thus obtained by a balanced mixture of agents that modify rheology, namely fluidizers (polyacrylate, polynaphtalene sulfonate, polymelamine sulfonate, lignosulfonates), thickeners acting by steric exclusion or hindrance (increase of viscosity) and so-called associative thickeners acting by gelling (creation of a three-dimensional network).

The first class of thickeners has the role of increasing the viscosity of the medium: these are macromolecules which, as a function of their affinity with the interstitial solution and hence of their radius of gyration, increase artificially (by steric exclusion) the effective solid volume fraction and hence the viscosity of the solution. This is the case of additives soluble in an alkali medium such as ASE (alkali soluble emulsions), cellulosic derivatives more particularly cellulose ethers such as hydroxyethylcellulose, methylcellulose and hydrocolloids of vegetal origin such as xanthan, guar, caruba gums which, alone, do not create zones of intermacromolecular junction. This is also the case for the hydrosoluble synthetic polymers of high molecular weight, such as polyethyleneoxide and cross-linked sodium polyacrylates, polyvinyl alcohols.

The second class of thickenings so-called associators, act by gelification and it is constituted by hydrosoluble polymers having several hydrophobic groups adapted to unite in micelles and permitting creating a three-dimensional network, not only themselves, but also with the thickener acting by steric exclusion. The interest of such a network is that when it is constituted, it gives rise to a great increase of viscosity. On the contrary, when it is subjected to shear stress, it is destroyed because of the weakness of the micelle type connections. Such a Theological behavior is quite advantageous, in the field of the cement composition of the invention, because this high viscosity at rest permits overcoming the problems of sedimentation, segregation, sweating and instability of the occluded air. Moreover, under shear stress, the drop in viscosity gives to the product excellent pumpability and sufficient workability to qualify the cement composition as self-leveling and self-smoothing.

As a thickening agent of the gelling type can be selected modified hydrophobic synthetic hydrosoluble polymers, for example acrylic or urethane base such as polyacrylates (HMPA-Hydrophobically Modified Polyacrylates or HASE-Hydrophobically Alkai Soluble Emulsion) or polyurethanes (HEUR-Hydrophobically Modified Urethane Block Copolymers), or else hydrocolloids, polysaccharides and natural or semi-synthetic hydrosoluble polymers, all being hydrophobically modified.

The preferred associative thickener is a hydrophobically modified polyoxyethylene urethane block copolymer (HEUR) conventionally synthesized by reacting an excess of diisocyanate with a polyethylene glycol. To the product of this first reaction is then added a primary alcohol or a primary amine (for example a fatty alcohol or a fatty amine with a $C_8$ to $C_{30}$ single radical or having fluorine, alkyl, alkene groups, . . . ).

Moreover, the combination according to the invention of the two types of thickeners have the supplemental advantage of modifying the rheology of the mortar importantly without having recourse to very high quantities of organic material, which permits containing the delay of setting systematically provided by thickeners known at present. Without this combination, the hardening would take place only after 24 hours.

Preferably, to the composition according to the invention is added water in proportions from 40 to 90 parts by weight, preferably between 70 and 80, per 100 parts by weight of Portland cement.

The cement composition according to the present invention can be used for producing self-leveling liquid castings.

Preferably, and in contrast to anhydrite castings, its process of production requires only a single casting, no matter what the required thickness of the casting. Such a casting is thus usable only at the end of 24 hours. The production time is thus substantially reduced relative to castings produced with alumina base cement compositions (despite a much longer working time), or including calcium sulfate, or anhydrite based.

Castings whose thickness can exceed about 6 cm, namely even 8 cm or 10 cm, can be easily cast in a single pass. They thus permit quickly cladding solar heating tubing, or even evening soils of unequal levels with differences of more than 5 cm, for example.

4. EXAMPLES

The invention is illustrated hereafter by the following non-limiting examples.

The fluid cement composition according to the invention is generally prepared by blending products entering into its constitution (mixing operation). The order of introduction of said products into the blender can be any at all. For example:

a) There can first be mixed dry, the rheology modifying agents (fluidizing and thickening) and the possible surface active agents, with the Portland cement. There is thus obtained a composition usable for the preparation of a liquid casting, except that said composition comprises neither water nor sand. To this composition is then added the mixing water. The obtained combination is thus blended, generally at low speed. Finally, there is progressively added the sand and blending is conducted at high speed.

b) There can also be mixed, dry, the agents that modify rheology and any surface active agent, with the sand and the Portland cement. There is thus obtained a mixture usable (in particular at the worksite) for the preparation of a liquid mortar or concrete. It then suffices to add to this mixture the mixing water and to blend the combination that is obtained, in general at high speed, to obtain a composition according to the invention.

c) Finally, the two types of thickeners can be mixed and a portion of the fluidizer, with the sand, the Portland cement and water. There is thus obtained a composition usable (in particular at a concrete center and in a cement mixture) for the preparation of fluid mortar or concrete, free from surface active agent, which composition does not comprise all the fluidizer. It then suffices to introduce the other part of the fluidizer and any surface active agent into this composition and to blend the combination obtained. Its high fluidity ensures a perfect homogeneity of the composition according to the invention, during incorporation of the last part of the fluidizer and of any surface active agent, just before emplacement or casting.

The materials usable are given below by way of example:

Portland cement CEM I or Portland cement compound CEM II (as defined by the standard NF P 15-301: 1994)

Superplasticizer (fluidizer) acrylate or methacrylate based (in the form of an aqueous solution of 33% of dry extract or in dry form):

SSP 104 described in patent application EP 0 725 044 (at 31% of active material) which is a terpolymer compound of sodium acrylate, of sodium methacrylate and of polyethylene oxide or Cimfluid 2000AC (at 28m % of active material) which comprises a polyethylene oxide or low mass and a copolymer or sodium methacrylate and polyethylene oxide methacrylate. By acrylate base additives, is also meant polymers or copolymers, such as those described below:

- copolymers of a) acrylic or methacrylic acid and of b) hydroxy-($C_2$–$C_3$) alkylester of acrylic or methacrylic acid, as those described in patent application EP 0 303 747,
- mixture comprising at least one copolymer of alkenylether of formula (I), at least one polyalkenyl ether of formula (II), and maleic anhydride, as anhydride, its hydrolysis products or salts of said hydrolysis products, as described in EP-0 619 277,
- copolymer of formula (I) described in JP 6-48 797,
- superplastifying additive obtained by terpolymerization of monomers of formulas (IV), (V) or (VI) as described in EP 0 612 702,
- salt of the polymer formed by a reaction of a polycarboxylic acid with an acrylic polymer containing a nitrogen atom, typically in aqueous solution, as described in FR 2 656 297,
- polymer composition or one of its salts which is a copolymer of a mono-ester of maleic acid with a compound of formula (I), and of a monomer of formula (II), as defined in FR 2 668 773,
- statistical copolymer in the form of a free acid or salt, comprising three types of monomers, as described in FR 2 671 090,
- vinyl copolymer soluble in water "representative" of linera copolymers of vinyl acetate and N-substituted maleamic acid, according to formula (A) described in EP 0 604 676,
- dispersing agent comprising a hydrosoluble vinyl copolymer obtained by radical copolymerization in aqueous solution from monomers of formulas (1), (2), (3), (4) and (5) as described in patent application EP 0 590 983,
- copolymer obtained from (A), (B), (C) and (D), as described in EP 0 610 699,
- hydrosoluble polymer or copolymer of ethylene carboxylic acid selected from acrylic, methacrylic, fumaric, maleic, itaconic, crotonic, aconitic, sinapic, mesaconic, undecylinic, angelic, hydroxy-acrylic acid, and maleic anhydride, as described in FR 2 699 915,
- additive to control the fluidity of the cement compositions, comprising at least one copolymer obtained from a monomer (a) of alkylene glycol monomethacrylic acid ester of formula (I) and a monomer (b) based on methacrylic acid of formula (II), or else a copolymer obtained from a monomer (d) based on monomethyl allyl ether of alcoxypolyalkylene glycol of formula (III) and a monomer (b) based on methacrylic acid of formula (IV) as defined in FR 2 706 447,
  - or any other superplastifier, for example of the polynaphtalene sulfonate or melamine sulfonate type.
- Conventional thickeners (acting by exclusion) used in the form of dry material:

They are selected from polymers of natural origin such as the polysaccharids:
  guar gum,
  xanthan gum,
  caruba,
  modified cellulose,
  starch modified or not, or from synthetic hydrosoluble polymers of high molecular weight:
  very long chain polyethylene oxide,
  cross-linked sodium polyacrylates,
  polyvinyl alcohols, or their combinations.

Thickeners of the gelling type (used in the form of a solution of water-cosolvant type glycol ether of 50% dry extract or in dry form):

These hydrosoluble polymers are selected from:
Alkali Soluble Emulsions
Hydrophobically Alkali Soluble Emulsions
(Hydrophobically Modified Urethane block copolymers): modified hydrophobic urethane polyethylene oxide bloc copolymers
polyether-polyols
hydrophobically modified hydroxyethyl cellulose.

Surface active agents:

These molecules have a certain miscibility with water and have the tendency to accumulate at the air-water interface.

The preferred surface active agents of the invention are of the zwitter ion type or non-ionic type because they have a very great foaming effect and are insensitive to any variation of pH.

Sand: of a granulometry preferably about $\leq 5$ mm.

The fluid mortars are obtained by intimate blending in a blender of the Perrier type, the total duration of blending being 5 to 7 minutes.

The properties of the fluid mortars tested are as follows:

Measurement of Spreading:

Spreading is measured with a cone of the dimensions Øsup×h×Øbase=7×6×10 cm$^3$. The cone if filled with mortar, then is raised as vertically as possible. Spreading is measured at three diameters, with the help of a sliding foot. The value of spreading, corresponding to the mean of the three diameters, must be greater than 200 mm so that the mortar will be considered as fluent and self-levelling.

Development of Spreading with Time:

The measurement of spreading of the self-levelling fluid mortar prepared as above is carried out up to three hours after beginning of blending. Between each measurement, the product of said invention is left to rest and is re-blended several seconds before carrying out measurement.

Sedimentation Test:

The mortar is cast, just after its mixing, in a transparent tube of an internal diameter equal to 4.3 cm and of a height equal to 50 cm closed at the bottom. The upper opening is closed with a plastic film which will not be in contact with the free surface of the mortar. After 6 and 48 hours, in the hardened condition, visual observation is effected. There is noted a possible sweating of water, a possible lack of height relative to the initial position of the surface of the mortar, the appearance of this latter, the size and distribution of the air bubbles along the wall of the tube. Finally two cylinders of 5 cm height are cut respectively from the top and bottom of the 50 cm tube. After unmolding, the density of these two sections is then determined by hydrostatic weighing.

Mechanical Performance:

There are produced from the examples of the invention, standard specimens 4×4×16 cm$^3$ in series of three. Unmolding is carried out at 24 hours, their preservation in the mold having taken place at 20° C. Immediately after unmolding, the simple compressive resistance is measured, which corresponds to the pressure necessary to burst the specimens that are compressed between two jars (rupture stress). The mean of the results obtained for the three specimens of each series is given in Table 2.

Density:

It is calculated from measurements of the mass and of the volume of the produced specimens for the determination of mechanical performance, the measurements being carried out just after unmolding, by taking the mean of the results obtained for 3 specimens.

Rising of the Edges upon Drying ("Curling"):

The rising of the edges or curling is measured with a laboratory device according to FIG. 1. The mortar is cast into a mold (1) of 33×33×3 cm$^3$. Metallic inserts (2) are held by a frame for the first 24 hours. Then, two movement detectors measuring the shrinkage at the center of the plate ($S_1$ and $S_2$) and four movement detectors ($L_1$, $L_2$, $L_3$ and $L_4$) measuring the rising of the edges, are fixed on these inserts. A scale ($W_1$) also permits following the change of the mass. All these data are recorded over time. The device is disposed in a climatic chamber (not shown) permitting holding it at 20° C. and 50% relative humidity. A thermal shock is applied between the seventh and ninth day (40° C. at the surface of the specimen) (4), by means of a light bulb (3) located above the specimen (4).

Figure 3:
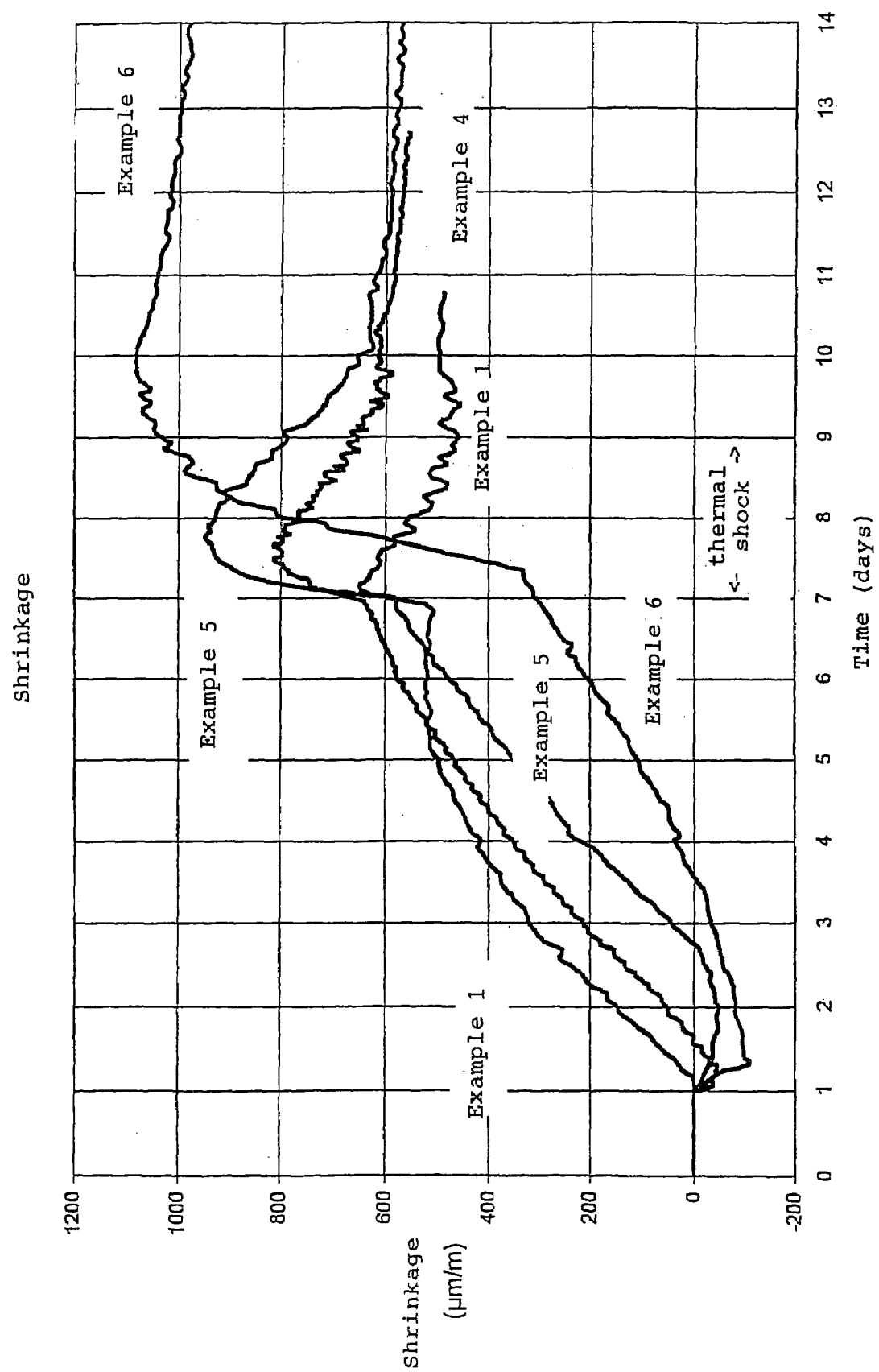
Figure 4:
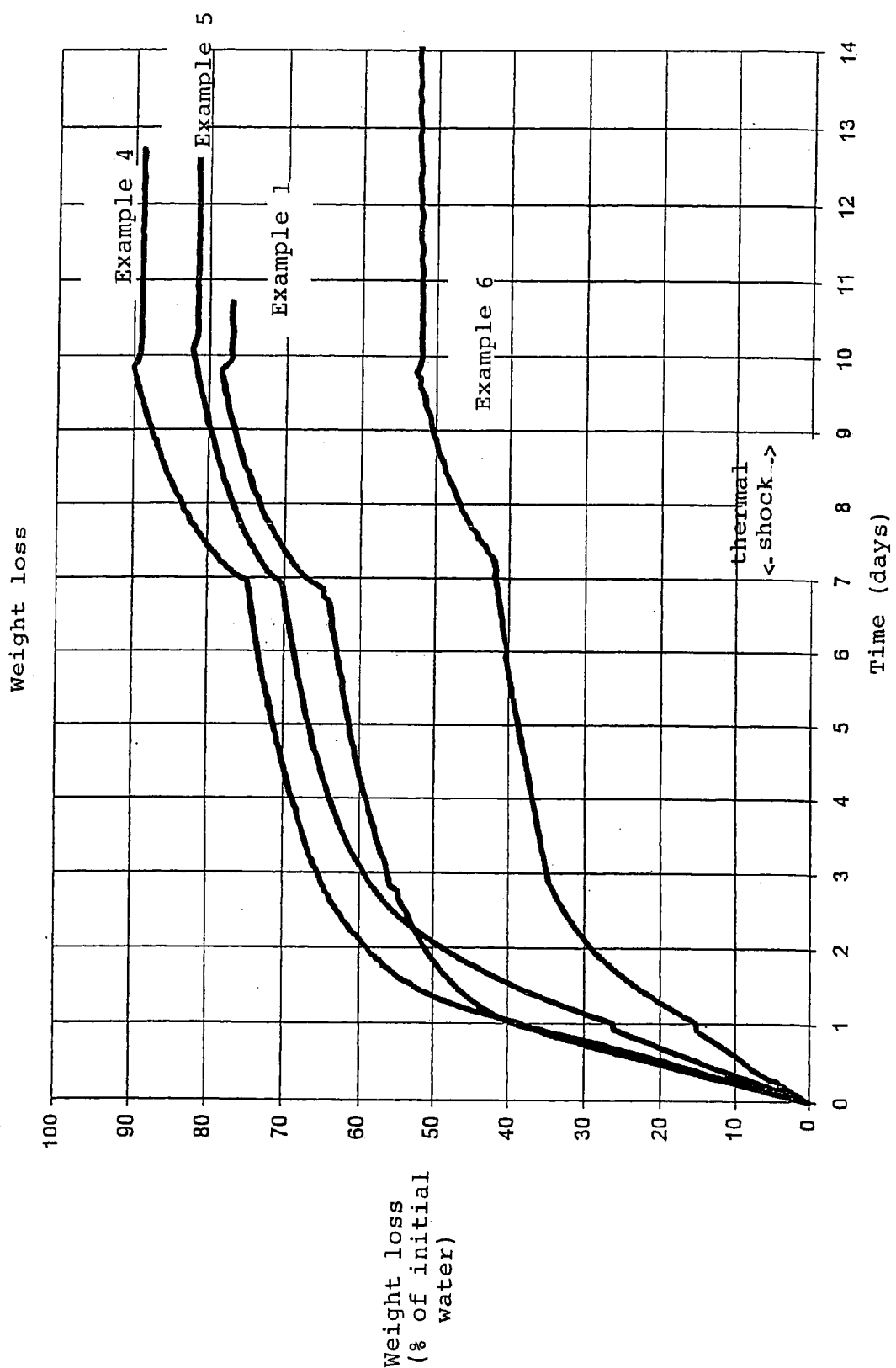

This device permits reproducing in the laboratory the behavior of a slab and measuring the curling (FIG. 2), the shrinkage (FIG. 3) and the change in mass following loss of water (FIG. 4).

Table 1 shows the cement compositions in the following examples 1 to 6, and Table 2 the results of the measurements carried out on them.

EXAMPLE 1

Figure 2:
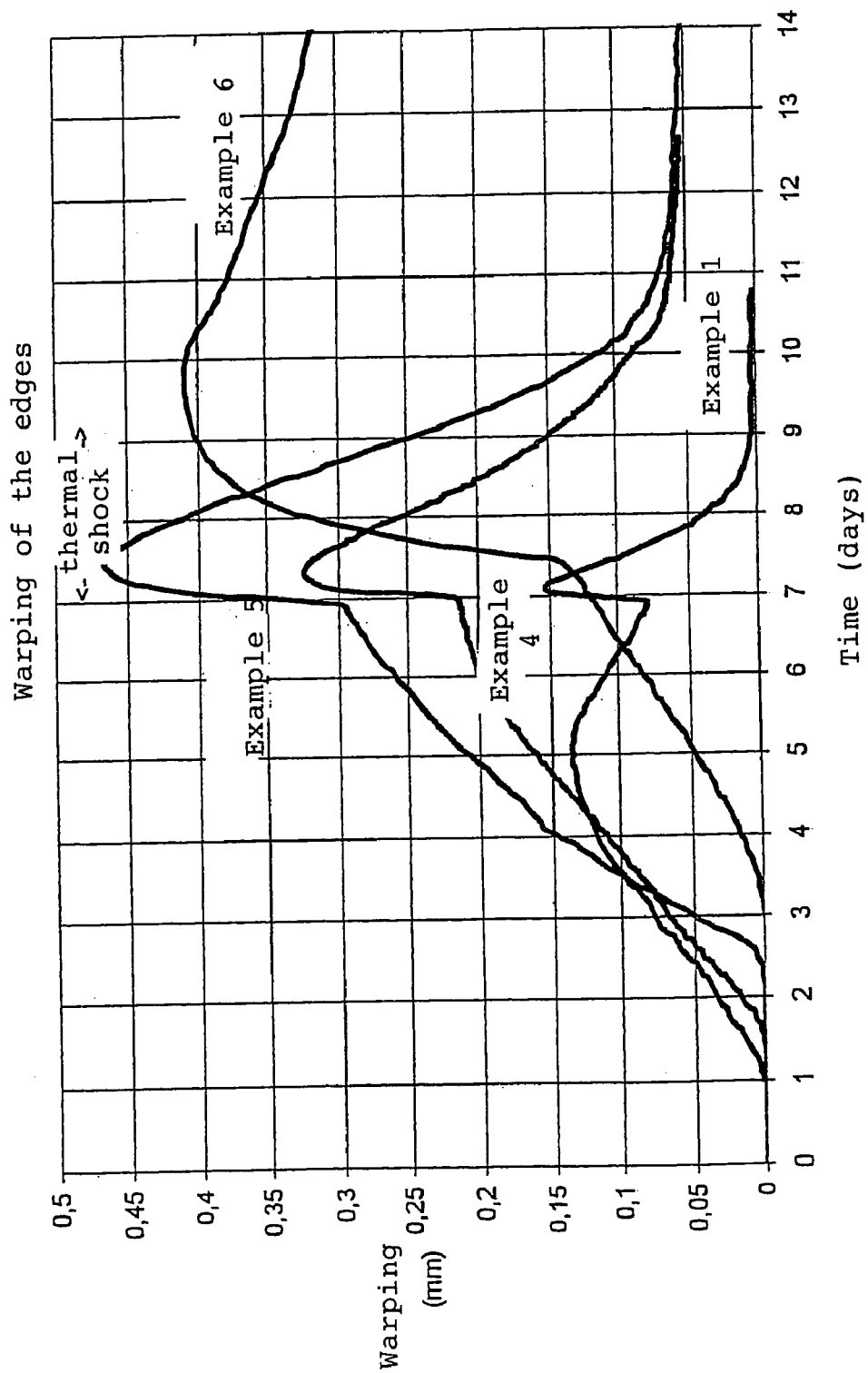

A fluid mortar is prepared according to a preferred composition of the invention comprising, per 100 parts by weight of Portland cement (CPJ-CEMII 32.5):
   386 parts of sand ≦4 mm
   74 parts of water
   0.63 part of acrylate base superplastifier (Cimfluid 2000AC)
   0.11 part of polyethylene oxide Mw about 4,000,000
   0.17 part of polyethylene oxide bloc copolymer of urethane hydrophobically modified
   0.11 part of sodium N-lauryl beta iminopropionate The results of the measurements carried out on this mortar are indicated in Table 2, and in FIGS. 2, 3 and 4.

The mortar is very stable, it keeps its fluidity, which gives it the self-leveling character necessary for casting beyond 3 hours. The mechanical resistance is satisfactory at 24 hours (Table 2) and permits walking on the slab when this happens.

Drying of the specimen once hardened causes rising of the edges (FIG. 2), as would be expected. Simultaneously, the specimen is subjected to shrinkage (FIG. 3) and a loss of mass connected with loss of free water (FIG. 4). However, beyond five days, the edges of the specimen return to their initial position whilst the shrinkage tends to stabilize at a value of about 600 μm/m. Stabilization of shrinkage corresponds to complete drying of the specimen. The application of thermal shock between the seventh and ninth day gives rise to renewed rising of the edges, accentuates shrinkage, and the loss of free water still present in the specimen, without however preventing the return of the edges to their initial position. Thus, the phenomenon of curling is noted but it rapidly disappears. The composition of the mortar thus permits the relaxation of stresses. The drying has not given rise to damage of the specimen. Finally, it keeps its initial flatness, which was the desired object.

COMPARATIVE EXAMPLE 2

A Single Thickener

A fluid mortar is prepared comprising 100 parts by weight of Portland cement (CPJ-CEMII 32.5):
   386 parts of sand ≦4 mm
   74 parts of water
   0.63 part of acrylate base superplastifier (Cimfluid 2000AC)
   0.11 part of sodium N-lauryl beta iminopropionate and only one thickener acting by steric exclusion:
   0.28 part of polyethylene oxide Mw about 4,000,000

The results of this example are set forth hereafter with those of Example 3.

COMPARATIVE EXAMPLE 3

A Single Thickener

A fluid mortar is prepared comprising, for 100 parts of Portland cement (CPJ-CEMII 32.5):
   386 parts of sand ≦4 mm
   74 parts of water
   0.63 part of acrylate base superplastifier (Cimfluid 2000AC)
   0.11 part of sodium N-lauryl beta iminopropionate and only one thickener of the gelling type:
   0.28 part of hydrophobically modified polyoxyethylene urethane bloc copolymer The results permitting comparing the behavior of compositions according to Examples 1, 2 and 3 are given in Tables 2 and 3. It will be noted that only Example 1 gives simultaneously satisfaction in terms of consistency and resistance to sedimentation. Examples 2 and 3 show a modification of the density between the fresh state and the hardened state following a decrease of entrained air. However, the entrained air must be sufficient to permit establishment of a porosity, in the hardened state, which improves drying and limits the shrinkage gradient (following the humidity differential). This is necessary for the obtention of low susceptibility to the curling phenomenon.

The comparison of the results of Examples 2 and 3 with those of Example 1 permits noting a synergetic effect when the cement composition comprises the two types of thickeners according to the invention.

EXAMPLE 4

A fluid mortar is prepared according to the invention, comprising per 100 parts by weight of Portland cement (CPJ-CEMII 32.5):
   386 parts of sand ≦4 mm
   74 parts of water
   0.63 part of acrylate base superplastifier (Cimfluid 2000AC)
   0.11 part of hydroxypropyl guar, Mw about 220,000 to 500,000

0.17 part of hydrophobically modified polyoxyde ethylene polyurethane bloc copolymer 0.11 part of sodium N-lauryl beta iminoproprionate The results of these measurements are indicaed in Table 2 and FIGS. 2, 3 and 4.

This mortar composition differs from that of the preceding examples as to the nature of the conventional thickener used. The behavior of the fresh mortar (table below) and hardened mortar (Table 2) are very near to those corresponding to the composition of Example 1. The principal difference resides in the time at the end of which stress release is produced, longer for Example 4 (between seven and eight days) than for Example 1 (five days). Because of the retardation in establishment of stress relaxation, the amplitude of rising is greater for the composition of Example 4, as shown in FIG. 2, but, for Example 4, only a very small rising of the edges remains over a long time.

COMPARATIVE EXAMPLE 5

With Anhydrite

A fluid mortar is prepared comprising 100 parts by weight of Portland cement (CPJ-CEMII 32.5):

20 parts of anhydrite 390 parts of sand ≦4 mm 85 parts of water 0.7 part of polynaphtalene sulfonate 0.2 part of modified starch The results of the measurements are indicated in Table 2 and in FIGS. 2, 3 and 4.

The composition of Example 5 comprises anhydrite. The rheological characteristics of the fresh mortar (Table 2) are inferior to those of the preceding examples whilst the quantity of water relative to the mass of cement is greater. The decrease in spreading is attributable to the presence of anhydrite, which increases the water requirement of the mortar, which effect is well known to those skilled in the art. This Example 5 shows that its composition, based on cement and anhydrite, permits eliminating, to a certain degree, the misbehavior of curling because beyond seven to eight days of drying stress release is apparent, which permits the specimen to return to its initial flatness (FIG. 2). It is noted, however, that the amplitude of rising of the edges is very much greater than that observed for examples according to the invention (Examples 1 and 4).

COMPARATIVE EXAMPLE 6

Mortar for a Conventional Self-leveling Casting with High Compactness

A fluid mortar is prepared comprising 100 parts by weight of Portland cement (CPA-CEMI 52.5):

187 parts of fly ash 357 parts of sand ≦4 mm 100 parts of water 1.75 parts of acrylate based superplastifier (Cimfluid 2000AC)

2.9 parts of precipitated silica performing the role of a granular supplement

The results of the measurements are indicated in Table 2 and FIGS. 2, 3 and 4.

This example shows the behavior of cement castings which have serious damage during drying, damage connected to the phenomenon of curling. The mortar has all the required characteristics to obtain a self-leveling casting, particularly fluidity (Table 2). Contrary to what is observed for the composition of Examples 1 and 4 (the present invention) and 5 (additional of anhydrite), no stress relaxation phenomenon is observed (FIG. 2) during the necessary duration of complete drying of the mortar (FIG. 4). Clearly, the rising of the edges is less marked during the first days (drying is slower, the structure being more compact), but it continues during drying until it reaches a value much higher than that corresponding to each of the composition of Examples 1, 4 and 5, since within these latter the relaxation begins. Above all, the edges remain in raised position. The specimen is finally deformed. Any high load is thus adapted to break the material (fissurization) including its own weight.

TABLE 1

CEMENT COMPOSITIONS ACCORDING TO EXAMPLES 1 TO 6

| | Binders | | | | | |
| --- | --- | --- | --- | --- | --- | --- |
| Examples | CPJ-CEM II 32.5 | ANHYDRITE | CPA-CEM I 52.5 | FLY ASH | Sand ≦ 4 mm | Water |
| 1 | 100 | / | / | / | 386 | 74 |
| 2 (comparative) | 100 | / | / | / | 386 | 74 |
| 3 (comparative) | 100 | / | / | / | 386 | 74 |
| 4 | 100 | / | / | / | 386 | 74 |
| 5 (comparative) | 100 | 20 | / | / | 390 | 85 |
| 6 (comparative) | / | / | 100 | 187 | 357 | 100 |

| | Additives | | | | | | |
| --- | --- | --- | --- | --- | --- | --- | --- |
| | SUPER-PLASTIFIER | POLY-ETHYLENE OXIDE | HYDROPHOBICALLY MODIFIED BLOC COPOLYMER OF POLYETHYLENE OXIDE-URETHANE | SODIUM N-LAURYL BETA IMINOPRO-PIONATE | HYDROXY PROPYL GUAR | MODIFIED STARCH | COLLOIDAL SILICA |
| 1 | 0.63 | 0.11 | 0.17 | 0.11 | / | / | / |
| 2 (comparative) | 0.63 | 0.28 | / | 0.11 | / | / | / |

TABLE 1-continued

CEMENT COMPOSITIONS ACCORDING TO EXAMPLES 1 TO 6

| | | | | | | | |
|---|---|---|---|---|---|---|---|
| 3 (comparative) | 0.63 | / | 0.28 | 0.11 | / | / | / |
| 4 | 0.63 | / | 0.17 | 0.11 | 0.11 | / | / |
| 5 (comparative) | 0.7 | / | / | / | / | 0.2 | / |
| 6 (comparative) | / | / | / | / | / | / | 2.9 |

TABLE 2

RESULTS OF MEASUREMENTS CARRIED OUT ON COMPOSITIONS OF EXAMPLES 1 TO 6

| | Spreading | | | | | | Resistance to compression at |
|---|---|---|---|---|---|---|---|
| Example | End of blending | 15 min. | 75 min. | 135 min. | 195 min. | Density | 24 hours (Mpa) |
| 1 | 220 | 220 | 210 | 200 | 180 | 1.69 | 0.9 |
| 2 (comparative) | 190 | 190 | 175 | 160 | 150 | 1.70 | 0.9 |
| 3 (comparative) | 245 | 240 | 220 | 200 | 190 | 1.72 | (not measured) |
| 4 | 210 | 210 | 200 | 190 | 180 | 1.70 | 1.0 |
| 5 (comparative) | 160 | 155 | 145 | 135 | 130 | 2.22 | 0.9 |
| 6 (comparative) | 300 | 290 | 280 | 280 | 240 | 2.06 | 1.7 |

TABLE 3

| | Consistency | | | | | |
|---|---|---|---|---|---|---|
| | Immediate | | | | | |
| | Initial spreading | Fresh mortar | In the course of time, after reblending | | | |
| Examples | at the end of blending | density at the end of blending | Spreading 15 min | Spreading 75 min | Spreading 135 min | Spreading 195 min |
| Example 1 | 220 mm | 1.69 | 220 mm | 210 mm | 200 mm | 180 mm |
| Example 2 (comparative) | 190 mm | 1.70 | 190 mm | 175 mm | 160 mm | 150 mm |
| Example 3 (comparative) | 245 mm | 1.72 | 240 mm | 220 mm | 200 mm | 190 mm |

| | Sedimentation | | | | | |
|---|---|---|---|---|---|---|
| | at 6 hours | at 48 hours | | | | |
| | Surface condition of the mortar | Loss of height | Surface condition of the mortar | Appearance along the wall of the tube | Density of the upper segment | Density of the lower segment |
| Example 1 | no sweating | 0 cm | gray, smooth and brilliant | fine air bubbles of homogenous size along the height | 1.64 | 1.69 |
| Example 2 (comparative) | sweating and degassing | 2 cm | white, formation of craters and of a crust | large air bubbles deformed by their tendency to rise | 2.04 | 2.05 |
| Example 3 (comparative) | great sweating and degassing | 4.5 cm | creamy white, formation of a friable crust | large air bubbles surrounded by a yellow exudation | 2.05 | 2.02 |

What is claimed:

1. A self-leveling casting produced from a cement composition, said casting consisting of:
   100 parts Portland cement;
   at least one fluidizer;
   a surface active agent in an amount of 0.01 to 0.15 part of said Portland cement permitting adjusting the quantity of entrapped air about 15 and 20% in volume in the final casting; and
   a combination of a thickening agent acting by steric exclusion and a gelling thickening agent,
   wherein said casting is without supplemental addition of calcium sulfate in the form of anhydrite or gypsum and has a density of the order of about 1.6 to 1.9.

2. The self-leveling casting according to claim 1, which has a thickness greater than about 6 cm and is obtained in a single casting step.

3. The self leveling casting according to claim 1, wherein the thickening agent acting by steric exclusion is selected from the group consisting of polysaccharides and hydro-soluble synthetic polymers.

4. The self leveling casting according to claim 1, wherein the thickening agent by steric exclusion is selected from the group consisting of cellulose ethers, xanthan gum, guar gum and caruba gum.

5. The self leveling casting according to claim 1, wherein the gelling thickening agent is selected from the group consisting of hydrophobically modified hydrocolloids, hydrophobically modified polysaccharides, and hydrosoluble polymers of modified hydrophobic acrylic or urethane base.

6. The self leveling casting according to claim 1, wherein the gelling thickening agent is a hydrophobically modified bloc copolymer of polyethylene oxide and urethane.

7. The self leveling casting according to claim 1, wherein for 100 parts of Portland cement, 0.3 to 1 part of fluidizer; 0.01 to 0.15 part of surface active agent; 0.02 to 1 part of thickening agent; and 0.1 to 0.5 part of gelling agent are present.

8. A self-leveling casting consisting of:
100 parts by weight of Portland cement;
from 0.01 to 0.15 part of surface active agent;
from 0.3 to 1 part fluidizer;
from 0.02 to 1 part of thickening agent; and
from 0.1 to 0.5 part of gelling agent, wherein said composition has about 15 and about 20% in volume of entrapped air and a density of the order of about 1.6 to 1.9.

9. The self leveling casting according to claim 8, which has a thickness of greater than about 6 cm obtained in a single casting step.

10. The self leveling casting according to claim 8, wherein the thickening agent is selected from the group consisting of polysaccharides and modified hydrophobic hydrosoluble synthetic polymers.

11. The self leveling casting according to claim 8, wherein the thickening agent is selected from the group consisting of cellulose ethers, xanthan gum, guar gum and caruba gum.

12. The self leveling casting according to claim 8, wherein the gelling agent is selected from the group consisting of hydrophobically modified hydrocolloids, hydrophobically modified polysaccharides, and hydrosoluble polymers of modified hydrophobic acrylic or urethane base.

13. The self leveling casting according to claim 8, wherein the gelling agent is a hydrophobically modified bloc copolymer of polyethylene oxide and urethane.

14. A self-leveling casting consisting of:
100 parts of Portland cement;
0.3 to 1 part fluidizer;
0.02 to 1 part of thickening agent acting by steric exclusion;
0.1 to 0.5 part of gelling thickening agent and part of a surface active agent, wherein said casting is without addition of calcium sulfate in the form of anhydrite or gypsum,
said casting has about 15 and about 20% in volume of entrapped air, and said casting has a density of the order of about 1.6 to 1.9.

15. The self-leveling casting according to claim 14, which has a thickness greater than about 6 cm obtained in a single casting step.

16. The self leveling casting according to claim 14, wherein the thickening agent is a polysaccharide.

17. The self leveling casting according to claim 14, wherein the thickening agent is selected from the group consisting of cellulose ethers, zanthan xanthan gum, guar gum and caruba gum.

18. The self leveling casting according to claim 14, wherein the gelling agent is selected from the group consisting of hydrophobically modified hydrocolloids, hydrophobically modified polysaccharides, and hydrosoluble polymers of modified hydrophobic acrylic or urethane base.

19. The self leveling casting according to claim 14, wherein the gelling agent is a hydrophobically modified bloc copolymer of polyethylene oxide and urethane.

20. A self-leveling casting comprising:
100 parts of Portland cement;
0.3 to 1 part fluidizer;
0.02 to 1 part of thickening agent acting by steric exclusion;
0.1 to 0.5 part of gelling thickening agent and 0.01 to 0.15 parts of a surface active agent, wherein said casting is without addition of supplemental calcium sulfate in the form of anhydrite or gypsum,
said casting has about 15 and about 20% in volume of entrapped air, and said casting has a density of the order of about 1.6 to 1.9.

* * * * *